United States Patent [19]

Boling

[11] 3,911,822

[45] Oct. 14, 1975

[54] METHOD OF ATTACHING FIBER OPTICS BUNDLE TO LASER SQUIB

[75] Inventor: John L. Boling, Jefferson, La.

[73] Assignee: The United States of America as represented by the Secretary of the Army, Washington, D.C.

[22] Filed: May 22, 1974

[21] Appl. No.: 472,252

[52] U.S. Cl............ 102/70.2 R; 60/39.82 R; 60/256
[51] Int. Cl.² .......................................... F42C 19/00
[58] Field of Search................. 102/70.2 R, 70.2 A; 60/39.82 R, 39.82 E, 256

[56] References Cited
UNITED STATES PATENTS

| | | | |
|---|---|---|---|
| 3,258,910 | 7/1966 | Seymour............................... | 60/256 |
| 3,408,937 | 11/1968 | Lewis et al...................... | 102/70.2 R |
| 3,618,526 | 11/1971 | Baker.............................. | 102/70.2 R |
| 3,812,783 | 5/1974 | Yang et al....................... | 102/70.2 R |

Primary Examiner—Harvey E. Behrend
Assistant Examiner—C. T. Jordan
Attorney, Agent, or Firm—Robert P. Gibson; Nathan Edelberg

[57] ABSTRACT

A metal clad end attached to a fiber optic bundle. Said end being provided with snap rings to plug into a grooved socket in the propellant container, and an O-ring surrounding the end portion of said metal clad end to seal against the wall of said socket.

3 Claims, 1 Drawing Figure

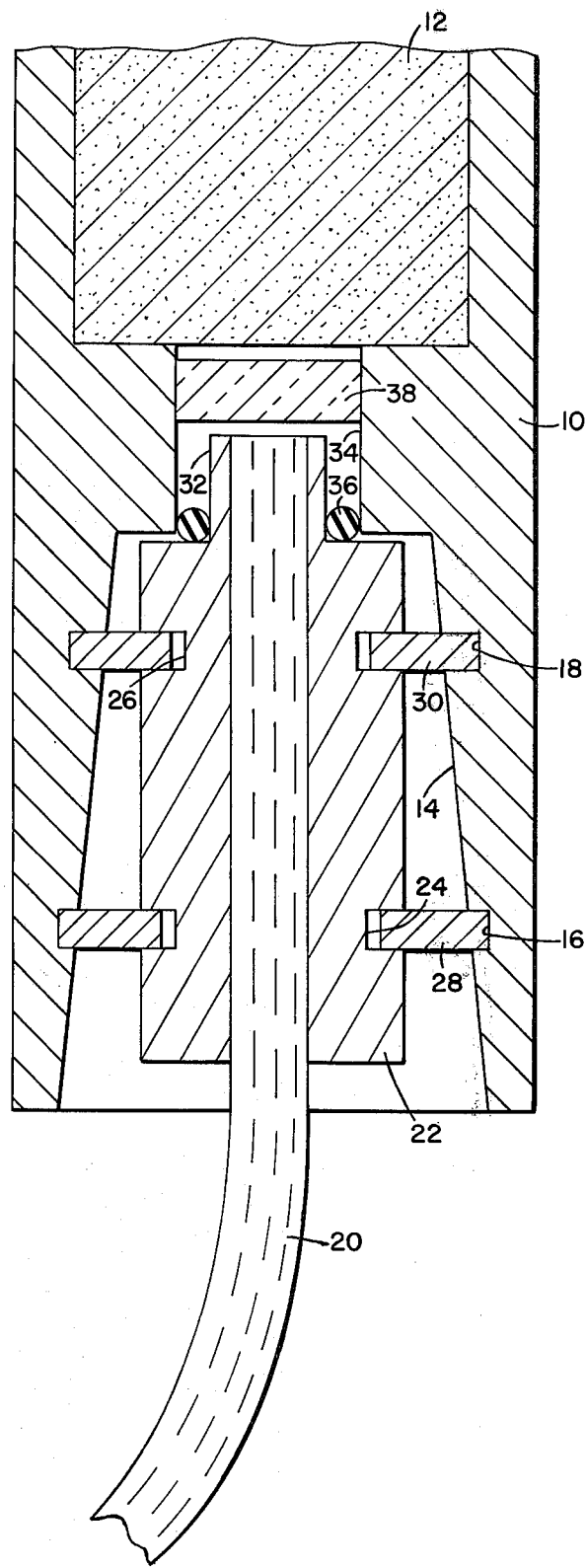

METHOD OF ATTACHING FIBER OPTICS BUNDLE TO LASER SQUIB

BACKGROUND OF THE INVENTION

Prior designs for connecting a fiber optic bundle to a missile involved a permanent type adhesive, such as epoxy, to seal the metal clad fiber optic end into a connector which was then screwed into the missile. This type of assembly required a great deal of hand assembly time and did not insure repeatability of sealing, bonding or alignment. This type of assembly also risks contamintion of the laser beam path both during the assembly and in the field.

It is therefor an object of this invention to provide a moisture free, easily connected assembly for fastening a fiber optic bundle to a firing squib in a rocket motor.

BRIEF DESCRIPTION OF THE DRAWING

The single FIGURE of the drawing is a section through the connector of the present invention.

DETAILED DESCRIPTION OF THE INVENTION

Referring now to the drawing 10 indicates the housing for the firing squib containing propellant 12. A tapered socket 14 is formed in the end of housing 10. Two annular grooves 16 and 18 are formed in the wall of the socket 14.

The fiber optic bundle 20 has a metal clad end 22 fixed thereon. The metal clad end 22 is provided with two annular grooves 24 and 26. Snap rings 28 and 30 are mounted in the grooves 24 and 26 and are adapted to be received in grooves 16 and 18 in the socket 14.

The inner end 32 of the metal clad end 22 extends inwardly into a tubular passageway 34 connecting the socket 14 with the interior of the housing 10. An O-ring seal 36 surrounds the end portion 32 and seals against the wall of the tubular passageway 34. A window 38 seals the inner end of the tubular passageway 34.

In the use of the connector, one end of the fiber optic bundle is connected to a laser (not shown). The end 22 is pushed into the socket 14 compressing the snap rings 28 and 30 until the grooves 16 and 18 are reached. The snap rings 28 and 30 snap into the grooves 16 and 18 to lock the assembly in place. The O-ring 36 seals the assembly against moisture penetration.

I claim:

1. Means for connecting a fiber optic bundle to a propellant squib comprising,
    a fiber optic bundle,
    a tubular metal end piece fixed to the end of said fiber optic bundle,
    annular grooves in the outer periphery of said tubular metal end piece,
    snap rings mounted in said annular grooves,
    a housing for said propellant squib having formed therein a frusto conical socket, and
    annular grooves formed in the wall of said socket and adapted to receive such snap rings.

2. A means for connecting a fiber optic bundle to a propellant squib as set forth in claim 1 wherein,
    a tubular passageway connects the inner end of said socket with the interior of said housing,
    a projecting tubular end on said tubular metal end piece adapted to project into said tubular passageway, and an O-ring surrounding said projecting tubular end of said tubular metal end piece and adapted to seal against the wall of said tubular passageway.

3. A means for connecting a fiber optic bundle to a propellant squib as set forth in claim 2 wherein a transparent window seals the inner end of said tubular passageway.

* * * * *